United States Patent
Aiouaz et al.

(10) Patent No.: US 7,920,046 B1
(45) Date of Patent: Apr. 5, 2011

(54) RFID READERS AND SYSTEMS INITIALIZING AFTER ANTENNA SWITCH AND METHODS

(75) Inventors: Ali Aiouaz, Mission Viejo, CA (US); Paul Dietrich, Seattle, WA (US); Omar Khwaja, Irvine, CA (US)

(73) Assignee: Impinj, Inc., Seattle, WA (US)

( * ) Notice: Subject to any disclaimer, the term of this patent is extended or adjusted under 35 U.S.C. 154(b) by 941 days.

(21) Appl. No.: 11/774,338

(22) Filed: Jul. 6, 2007

Related U.S. Application Data

(63) Continuation-in-part of application No. 11/749,235, filed on May 16, 2007.

(60) Provisional application No. 60/832,667, filed on Jul. 21, 2006.

(51) Int. Cl.
*G05B 23/02* (2006.01)

(52) U.S. Cl. ...... 340/3.63; 340/3.6; 340/3.61; 340/3.62; 340/7.25; 340/7.27

(58) Field of Classification Search .......... 340/3.6–3.63, 340/7.24–7.27, 464, 310; 375/132–137; 455/101–103
See application file for complete search history.

(56) References Cited

U.S. PATENT DOCUMENTS

| | | | |
|---|---|---|---|
| 5,519,381 A | 5/1996 | Marsh et al. | |
| 5,686,902 A | 11/1997 | Reis et al. | |
| 6,040,773 A | 3/2000 | Vega et al. | |
| 6,330,971 B1 | 12/2001 | Mabry et al. | |
| 6,483,427 B1 | 11/2002 | Werb | |
| 6,641,036 B1 | 11/2003 | Kalinowski | |
| 6,661,335 B1 | 12/2003 | Seal | |
| 6,903,656 B1 * | 6/2005 | Lee | 340/572.1 |
| 6,963,270 B1 | 11/2005 | Gallagher et al. | |
| 7,098,770 B2 | 8/2006 | Charrat et al. | |
| 7,103,087 B2 * | 9/2006 | Eastburn | 375/132 |
| 2004/0046642 A1 | 3/2004 | Becker et al. | |
| 2005/0280505 A1* | 12/2005 | Humes et al. | 340/10.1 |
| 2005/0280506 A1 | 12/2005 | Labanov et al. | |
| 2005/0280507 A1 | 12/2005 | Diorio et al. | |
| 2006/0071758 A1 | 4/2006 | Cooper et al. | |
| 2006/0077039 A1 | 4/2006 | Ibi et al. | |
| 2006/0261953 A1 | 11/2006 | Diorio et al. | |
| 2007/0035383 A1 | 2/2007 | Roemerman et al. | |
| 2007/0046432 A1 | 3/2007 | Aiouaz et al. | |
| 2007/0241906 A1* | 10/2007 | Malik | 340/572.7 |
| 2009/0085748 A1 | 4/2009 | Barnes et al. | |

OTHER PUBLICATIONS

EPCglobal, Inc "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. Dec. 14, 2004, http://www.

(Continued)

*Primary Examiner* — Benjamin C Lee
*Assistant Examiner* — Peter C Mehravari
(74) *Attorney, Agent, or Firm* — Turk IP Law, LLC

(57) ABSTRACT

RFID readers, reader systems, and methods are provided for processing RFID tags through interruptions for antenna change or other reasons. If the reason for the interruption is an antenna change, the reader restarts processing the tags initializing any operational parameters. If the reason is other than an antenna change, the reader determines whether the operation is to be continued or to be restarted upon power up and proceeds accordingly.

76 Claims, 10 Drawing Sheets

READER METHODS

OTHER PUBLICATIONS

EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005, http://www.
"Declaration of Stacy L. Jones authenticating attached website materials", www.autoid.org/SC31/sc_31_wg4_sg3.htm Sep. 1, 2006.

Diorio, et al., "Final Office Action", U.S. Appl. No. 11/210,573, filed Sep. 9, 2009.
Diorio, et al., "Final Office Action", U.S. Appl. No. 11/210,575, filed Sep. 9, 2009.
Humes, et al., "Office Action", U.S. Appl. No. 11/210,348, filed Aug. 24, 2005.

* cited by examiner

RFID SYSTEM

RFID TAG

RFID READER SYSTEM DETAIL

FIG. 8     READER METHODS

*EXAMPLE READER METHOD WHEN ANTENNA & FREQUENCY CHANGES ARE CLOSE*

ND SYSTEMS
RFID READERS AND SYSTEMS INITIALIZING AFTER ANTENNA SWITCH AND METHODS

RELATED APPLICATIONS

This utility patent application is a Continuation In Part (CIP) of U.S. application Ser. No. 11/749,235 filed on May 16, 2007. The benefit of the earlier filing date of the parent application is hereby claimed under 35 U.S.C. §120.

This utility patent application claims the benefit of U.S. Provisional Application Ser. No. 60/832,667 filed on Jul. 21, 2006, which is hereby claimed under 35 U.S.C. §119(e). The provisional application is incorporated herein by reference.

This application may be found to be related to the following applications:

Application titled "RFID READERS AND SYSTEMS WITH ANTENNA SWITCHING UPON TAG SENSING, AND METHODS", by the same inventors, application Ser. No. 11/749,235, filed with the USPTO on May 16, 2007, and assigned to the same assignee;

Application titled "RFID READERS AND SYSTEMS WITH ANTENNA SWITCHING UPON DETECTING TOO FEW TAGS AND METHOD", by the same inventors, application Ser. No. 11/749,281, filed with the USPTO on May 16, 2007, and assigned to the same assignee;

Application titled "RFID READER SYSTEMS AND METHODS FOR ANTENNAS WITH ADJUSTABLE DUTY CYCLE TO REDUCE CONTRIBUTED INTERFERENCE", by the same inventors, application Ser. No. 11/749,235, filed with the USPTO on Jun. 28, 2007, and assigned to the same assignee;

Application titled "RFID READERS AND SYSTEMS PERFORMING PARTIAL OPERATION PER ANTENNA AND METHODS", by the same inventors, application Ser. No. 11/769,444, filed with the USPTO on Jun. 27, 2007, and assigned to the same assignee; and Application titled "CHANGING MANNER OF DETERMINING A QUERY PARAMETER Q USED FOR INVENTORYING RFID TAGS", by Scott A. Cooper, Christopher J. Diorio, Todd E. Humes, and Vadim P. Lobanov, application Ser. No. 11/210,575, filed with the USPTO on Aug. 24, 2005, and assigned to the same assignee.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

An RFID reader may utilize antenna switching to cover multiple areas or enhanced coverage of tag populations especially in locations where tags may be moving such as dock doors. In addition to antenna switching, some readers may employ Frequency Hopping Spread Spectrum (FHSS) operation that includes switching of transmit frequencies at predetermined intervals for regulatory and/or performance reasons. A complication in processing tags may arise when an antenna switch occurs in the middle of a tag operation such as inventory of tags.

A reader may stop transmitting briefly for a number of additional reasons as well. During the non-transmit period, tags in the reader's field of view may lose their power, new tags may enter the field of view, and other changes may occur in the tag population depending on a length of the non-transmit period.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to processing RFID tags by an RFID reader system employing antenna switching. When RF transmission is interrupted during a tag processing operation, a reason for the interruption may be determined. If the reason is an antenna change, the likelihood of a change in tag population is large. Therefore, the reader may restart processing the tags by initializing any operational parameters. If the reason is other than an antenna change such as an FHSS frequency switch, the reader may determine whether the operation is to be continued or restarted upon power up and proceed accordingly.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
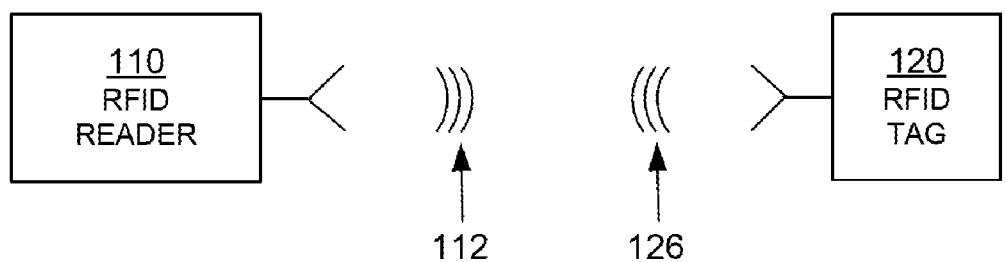
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Field Programmable Gate Array (FPGA), a general purpose micro processor, etc.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
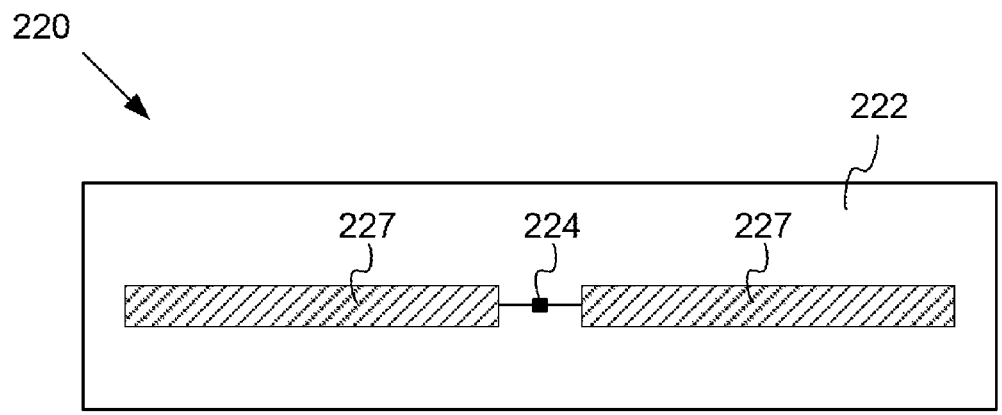
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that, at the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
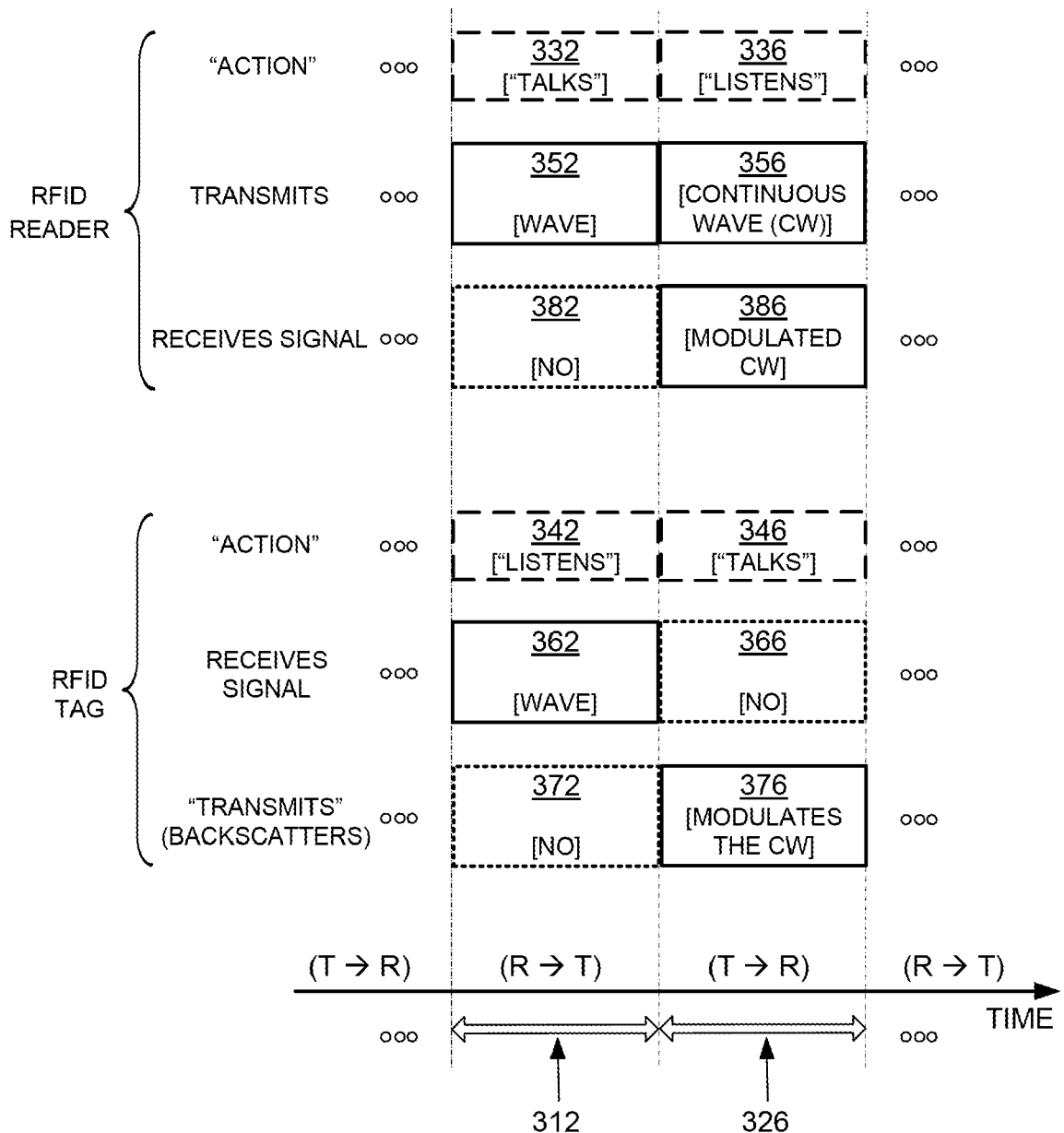
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
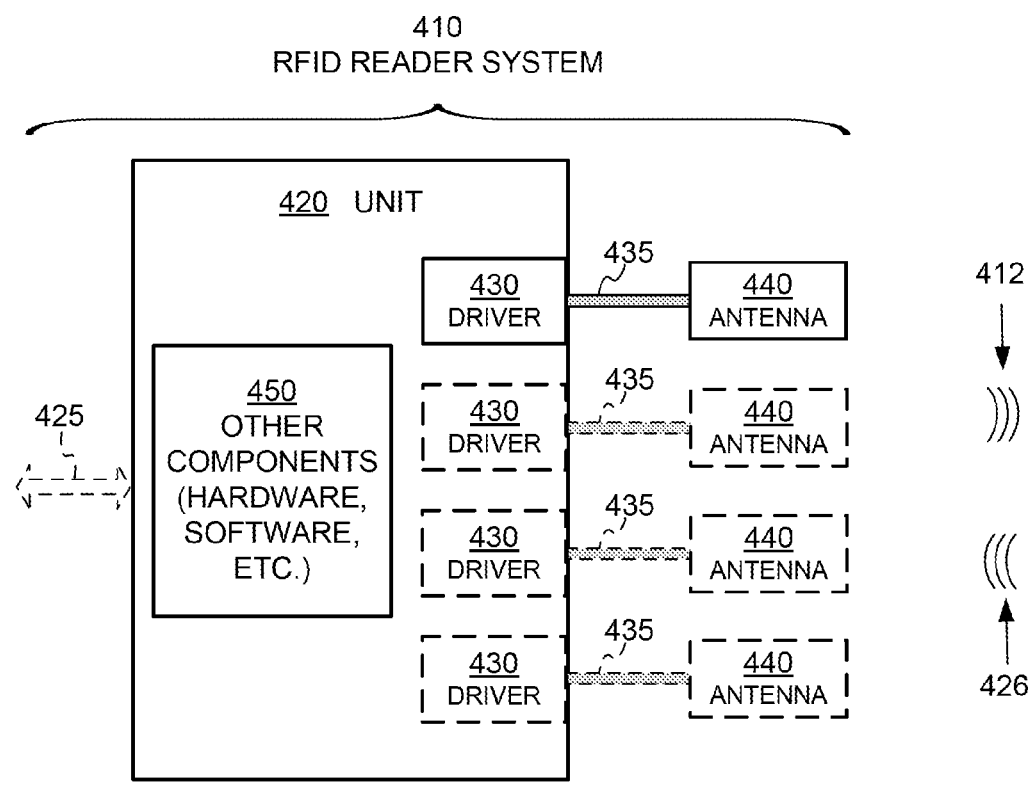
FIG. 4 is a detailed diagram of an example RFID system such as the RFID system of FIG. 1.

FIG. 4 is a block diagram showing a detail of an RFID reader system 410, which can be the same as reader 110 shown in FIG. 1. A unit 420 is also known as a box 420, and has at least one antenna driver 430. In typical embodiments it has four drivers 430. For each driver 430 there is an output, which is typically a coaxial cable plug. Accordingly cables 435 can be attached to the outputs of the provided respective drivers 430, and then the cables 435 can be attached to respective antennas 440.

A driver 430 can send a driving signal, to cause its respective antennas 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 becomes a signal sensed by driver 430.

Unit 420 also has other components 450, such as hardware and software, which may be described in more detail later in this document. Components 450 control drivers 430, and as such cause RF wave 412 to be sent, and interpret the sensed backscattered RF wave 426. Optionally and preferably there is a communication link 425 to other equipment, such as computers and the like, for remote operation of system 410.

Figure 5:
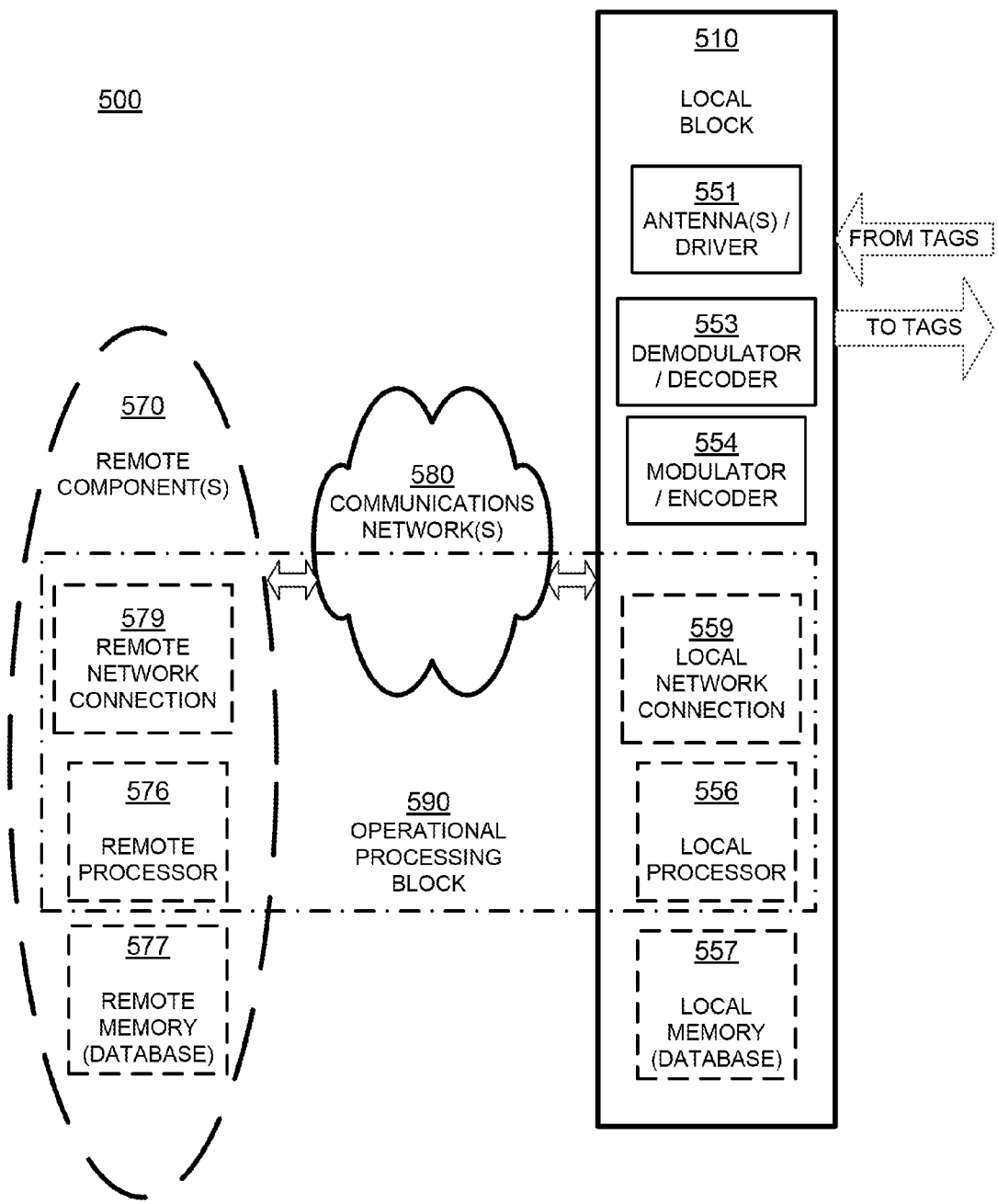
FIG. 5 is a block diagram of an RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 may be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, and so on. In turn, local block 510 then includes a local network connection 559 for communicating with network 580.

There can be one or more remote component(s) 570. If more than one, they can be located at the same place with each other, or in different places. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

Figure 6:
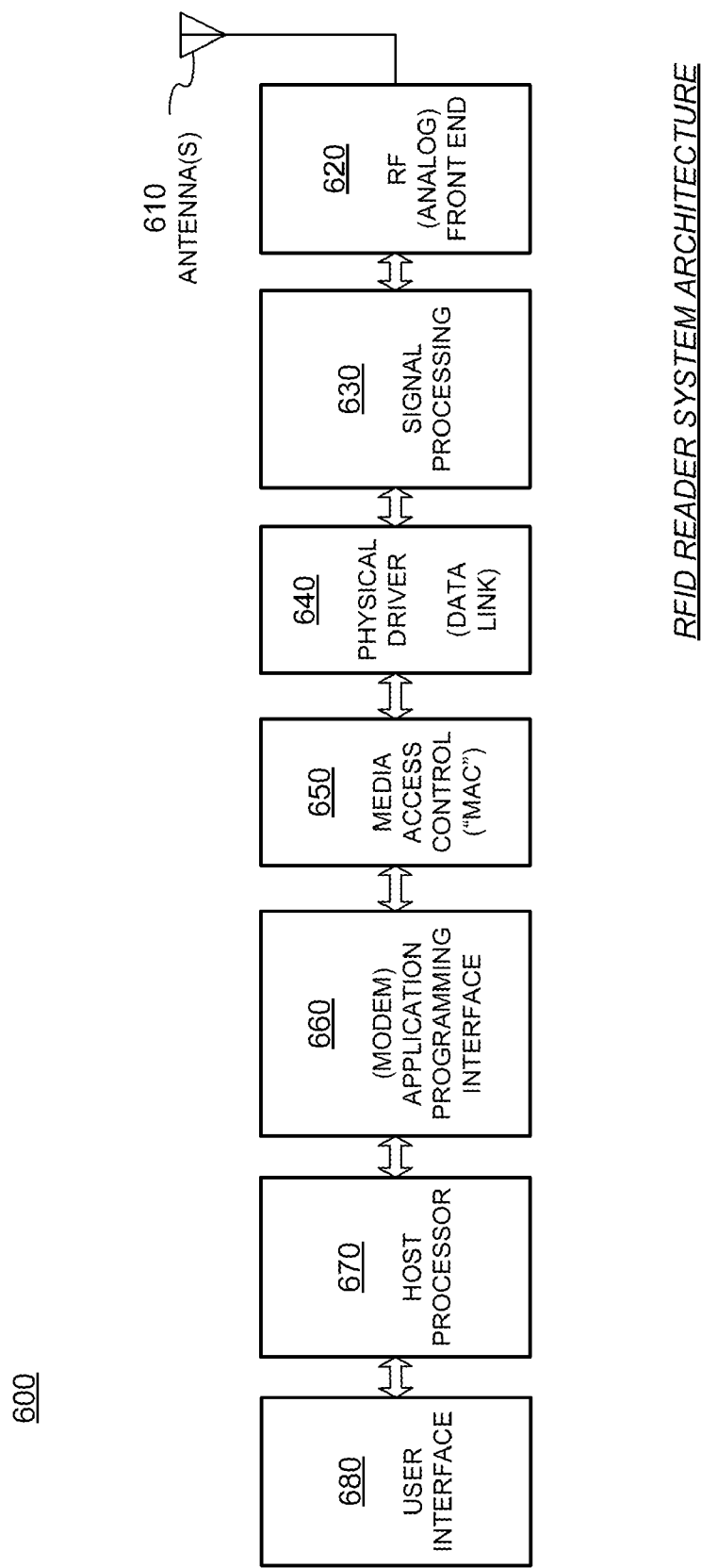
FIG. 6 is a block diagram illustrating major functional blocks of an RFID reader system.

FIG. 6 is a block diagram illustrating an overall architecture of a RFID reader system 600 according to embodiments. It will be appreciated that system 600 is considered subdivided into modules or components. Each of these modules may be implemented by itself, or in combination with others. It will be recognized that some aspects are parallel with those of FIG. 5. In addition, some of them may be present more than once.

RFID reader system 600 includes one or more antennas 610, and an RF Front End 620, for interfacing with antenna(s) 610. These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor.

System 600 moreover includes an Application Programming Interface module 660, which is also known as API, Modem API, and MAPI. In some embodiments, module 660 is itself an interface for a user.

System 600 further includes a host processor 670. Processor 670 exchanges signals with MAC layer 650 via module 660. In some embodiments, host processor 670 is not considered as a separate module, but one that includes some of the above-mentioned modules of system 600. A user interface 680 is coupled to processor 670, and it can be manual, automatic, or both.

Host processor 670 can include applications for system 600. In some embodiments, elements of module 660 may be distributed between processor 670 and MAC layer 650.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 628 as signals, which are in turn processed successively by the various modules in the chain. Processing can terminate in any one of the modules. In a transmitting mode, initiation can be in any one of these modules. That, which is to be transmitted becomes ultimately signals for antenna(s) 628 to transmit as wireless waves.

The architecture of system 600 is presented for purposes of explanation, and not of limitation. Its particular subdivision into modules need not be followed for creating embodiments according to the invention. Furthermore, the features of the invention can be performed either within a single one of the modules, or by a combination of them.

As mentioned previously, a single RFID reader system may have several antennas. Due to the Tx/Rx chain, the RFID reader system selects, drives, and listens from only one of its antennas at any given time. Furthermore, a combination of RFID systems is typically deployed, and they could coordinate antenna transmission between themselves to limit interference.

To complicate the design of multiple antenna reader systems, antennas may be facing different directions. Time spent on an antenna that views no tags (while the other antenna has tags in view) represents missed performance (missed opportunity to identify tags). Even though the antennas could all be facing at the same location, different ones view different groups of tags, and may have differential effectiveness. For example, a dock door with two antennas at different height on same side of the door connected to the same reader. In such a scenario, tag placement in the pallet would define which antenna is more likely to find which tags. Some tags may only be read by one of the antennas.

Moreover, synchronizing antennas between readers requires precision to limit system downtime. Synchronizing clocks accurately on separate processors is a complex problem. In addition, readers that view no tags and still transmit using their antennas increase the noise floor in a system deployment unnecessarily. This may cause degradation in the performance of other readers in the deployment which do view tags. Finally, antenna switching may need to be controlled at the speed of the air protocol. With the increased speed of new generation air protocols, increased demands are put on antenna switching.

Some of the solutions to challenges of static antenna switching mechanisms include user specifying time spent per antenna, user specifying order in which to cycle through antennas, or user specifying external triggers to start antenna operation. These approaches have their own limitations such as users or installers having to configure the reader(s) at time of deployment for a specific scenario, which may be costly and require tuning if scenario changes (e.g. conveyor belt speed changes, use of humans or forklifts for pushing pallets through the field of view of readers, etc.).

Additionally, tags may not be rapidly detected in a particular antenna read zone causing delay in seeing tags for the first time. Antennas may be grouped into "sources" (e.g. in a symmetrical deployment like a dock door, each of the 2 sources may be given same amount of time to see tags). This effectively gives a 50% duty cycle per door even if no tags are in that door. External triggers are also challenging to deploy and may break easily.

Figure 7:
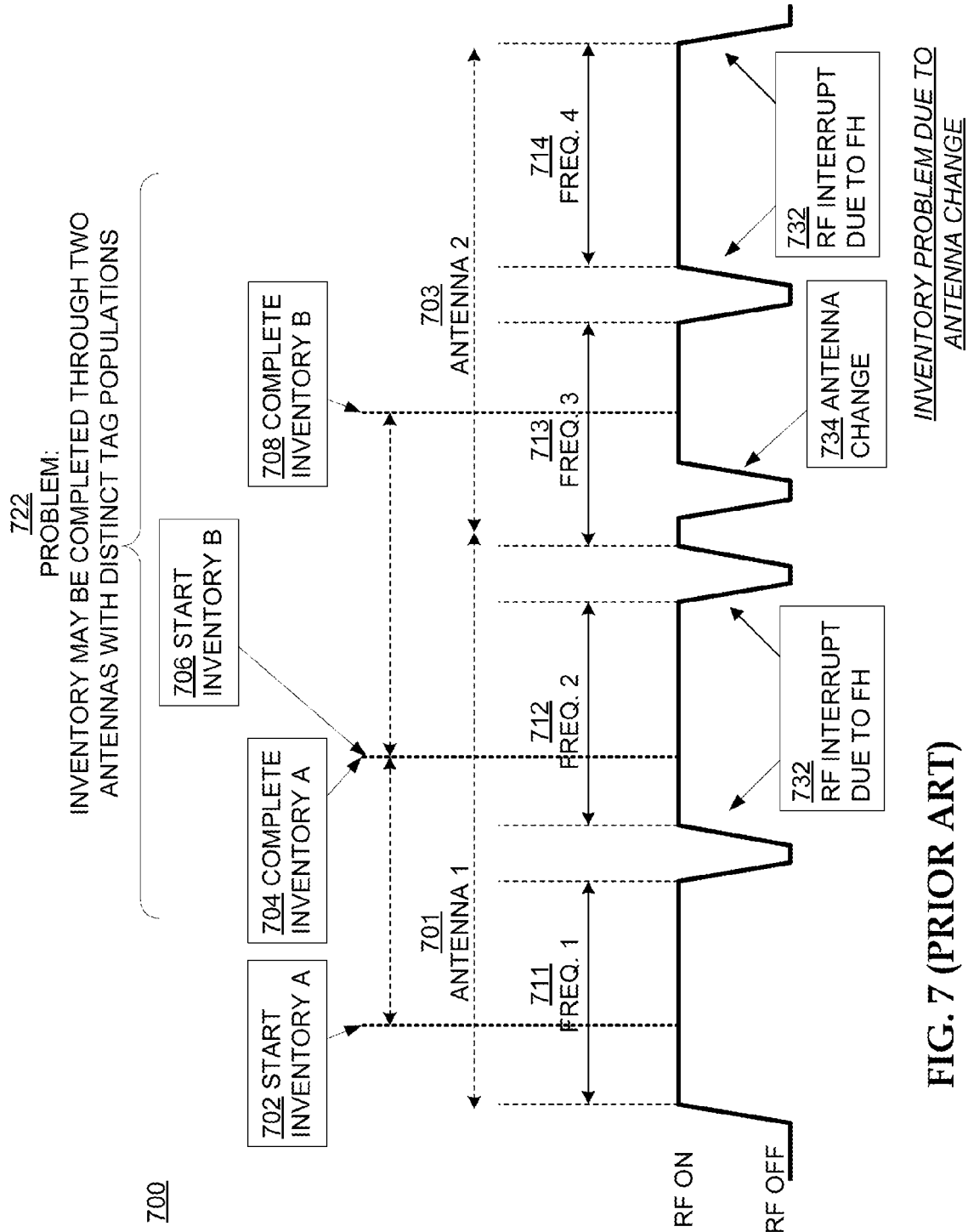
FIG. 7 is a diagram illustrating an operation of an RFID reader system where a tag operation (e.g. inventory) may be problematic due to antenna switching by the reader system.

FIG. 7 is a diagram illustrating an operation of an RFID reader system where a tag operation (e.g. inventory) may be problematic due to antenna switching by the reader system.

Inventorying of tags is one of the most common tag operations. During an inventory operation, a reader may communicate with tags in its field of view multiple times, cause tags to change their state, and so on. Thus, the interruption of an inventory operation may result in missed tags, double processing of tags, wasted time and reader resources.

Diagram 700 illustrates a reader beginning a first inventory operation A (702) while transmitting on frequency 1 (711). The inventory process is however interrupted by the reader switching to frequency 2 (712) due to an FHSS operation. During the frequency switch the transmitter is disabled, thus interrupting the RF communication (732).

Depending on its configuration, the reader may continue or restart the inventory operation when the transmission begins on frequency 2 (712) completing the inventory process (704) later during the transmission on frequency 2. A restart may unnecessarily prolong the operation and waste reader resources because the tag population is unlikely to change substantially when only the frequency changes. Therefore, the reader may simply continue the inventory operation after the frequency switch. A second inventory process B may then be started on frequency 2 (706).

The second inventory process B is first interrupted (732) by the frequency switch from frequency 2 (712) to frequency 3 (713) through which the operation continues. The inventory operation is interrupted for the second time (734) by an antenna change from antenna 1 (701) to antenna 2 (703). The reader also continues the operation through the antenna switch completing (708) on frequency 3 (713).

The problem (722) with this approach is that the tag population in the field of view of antenna 2 may be substantially different from the tag population in the field of view of antenna 1. Thus, the inventory may be completed on two disjointed tag populations with erroneous results or prolonged operation time and wasted resources.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination.

Methods are now described more particularly according to embodiments.

Figure 8:
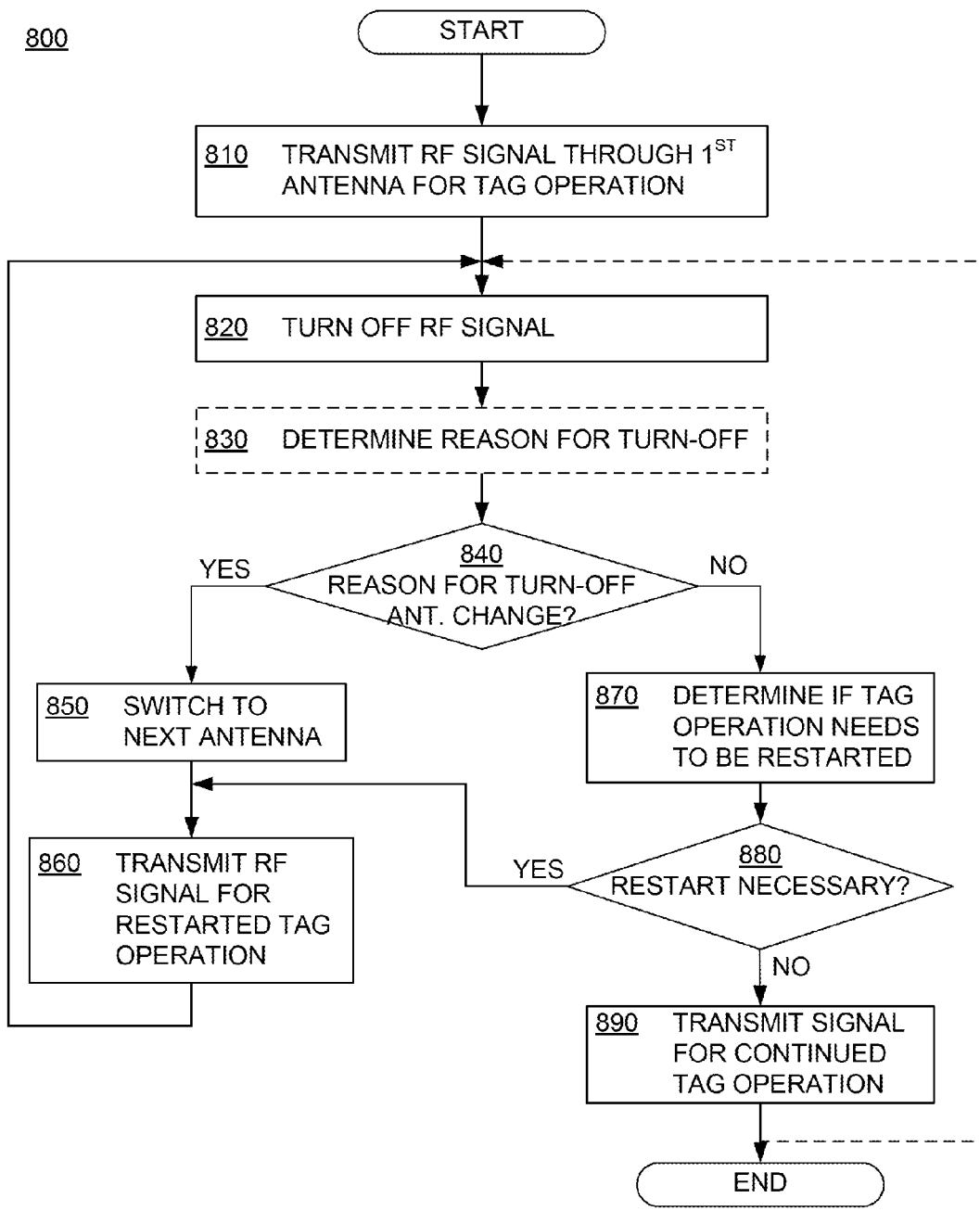
FIG. 8 is a flowchart of an RFID reader system initializing a tag operation following an interruption due to the RF signal due to antenna switching or another reason according to embodiments.

FIG. 8 is a flowchart of an RFID reader system initializing a tag operation following an interruption due of the RF signal due to antenna switching or another reason according to embodiments. Process 800 may be performed by one or more modules of an RFID reader system such as the reader system described in FIG. 5 and FIG. 6.

Process 800 begins with operation 810, where a reader transmits an RF signal for a tag operation through a first antenna.

According to a next operation 820, the RF signal is turned off by the reader. The signal may be turned off for a variety of reasons such as a frequency change due to an FHSS operation, an antenna change, a power interrupt, completion of an operation, and the like.

According to a next optional operation 830, the reason for turning off the RF signal is determined by the reader.

According to a next decision operation 840, a determination is made whether the reason for turning off the RF signal is an antenna change. If the reason is antenna change, the reader switches to a next antenna at subsequent operation 850.

According to operation 860 following operation 850, the reader transmits the RF signal for a restarted tag operation through the next antenna and may initialize any operational parameters.

If the determination at decision operation 840 is that the reason for turning off the RF signal is not an antenna change, process 800 continues to operation 870 where the reader determines whether the tag operation needs to be restarted.

If the signal turn off is for a brief duration and the tag population within the reader's field of view may remain substantially same, the operation may not need to be restarted.

According to a next decision operation 880, a determination is made whether a restart is necessary. If a restart is necessary, process 800 may continue to operation 860. If a restart is not necessary, a signal may be transmitted for continued tag operation at subsequent operation 890.

After operation 890, process 800 may optionally return to operation 820. Process 800 also returns to operation 820 after operation 860.

Figure 9:
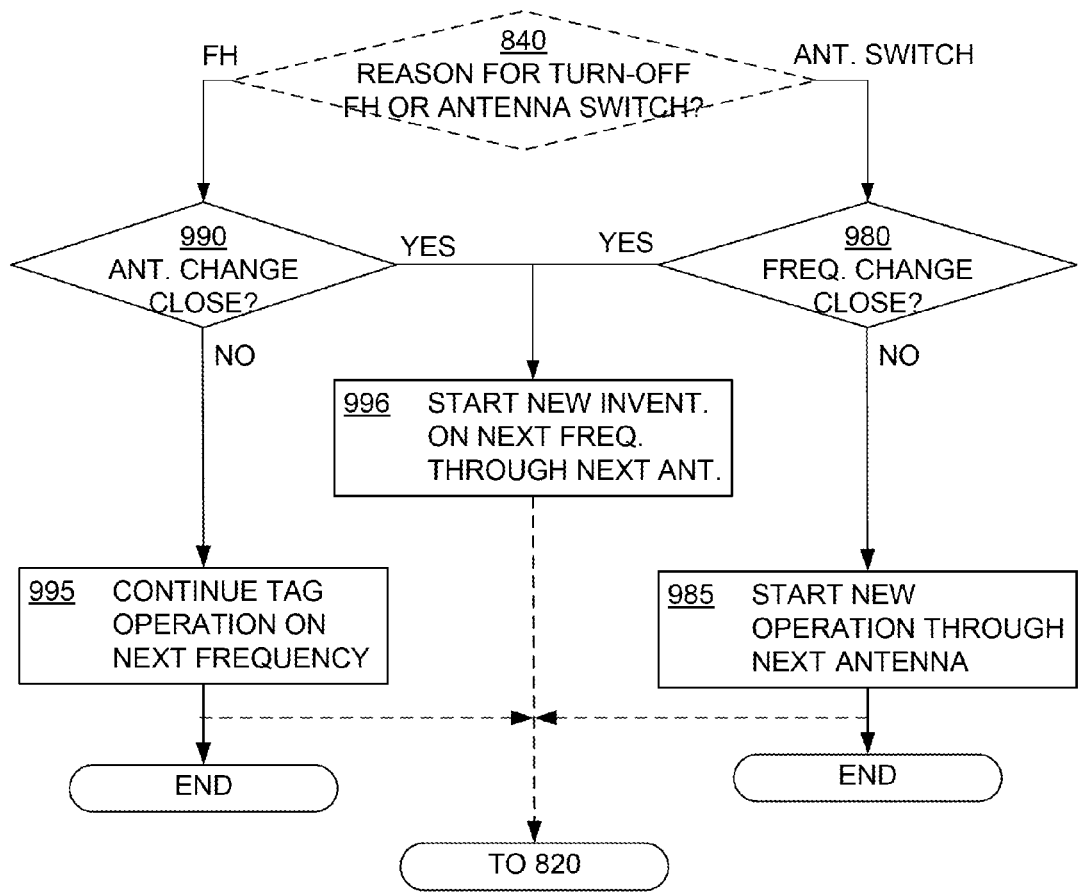
FIG. 9 is a flowchart of an example RFID reader system method within the process of FIG. 8 when the antenna switching and frequency hopping events are close to each other in time.

FIG. 9 is a flowchart of an example RFID reader system method within the process of FIG. 8 when the antenna switching and frequency hopping events are close to each other in time.

Process 900 begins with optional decision operation 840, where a determination is made whether the RF signal turn off is for an antenna switch or a frequency hop.

If the reason is frequency hop, another determination is made at the next decision operation 990 whether an antenna change is close. If the antenna change is not close, the tag operation is continued using the next frequency at next operation 995.

If the antenna change is close, the reader may start a new inventory round with initialized parameters using a next frequency through the next antenna at operation 996.

If the determination at optional decision operation is that the reason for the signal turn off is an antenna switch, another determination is made at next decision operation 980 whether a frequency switch is close.

If the frequency switch is close, the reader starts a new inventory round with initialized parameters using a next frequency through the next antenna at operation 996. Otherwise, the reader starts a new operation through the next antenna using the same frequency at next operation 985.

The reader may return to the signal turn off operation (820) of FIG. 8 after both operations 985 and 995.

The operations included in processes 800 and 900 are for illustration purposes. The described methods may be implemented by similar processes with fewer or additional steps, as well as in different order of operations using the principles described herein.

According to one embodiment, a method for an RFID reader system employing antenna switching may include causing a first signal for a first tag operation to be radiated through a first antenna, turning off the first signal for a first reason, determining whether the first reason is an antenna change from the first antenna to a second antenna, and if the first reason is the antenna change causing a second signal to be radiated through the second antenna, for a second tag operation that does not continue the first tag operation. The first tag operation may include a tag inventory operation.

According to another embodiment, the first tag operation may further include a Tag Population Check (TPC) before starting the tag inventory operation. A tag population check according to embodiments may include transmitting a signal and listening to determine if any tags are responding to the signal or not. If the first reason is an antenna change, the second tag operation may include restarting a tag inventory operation through the second antenna. The second tag operation may further include another TPC before restarting the tag inventory operation through the second antenna. Moreover, the second signal may be radiated responsive to detecting that tags are present in the reader's field of view.

According to a further embodiment, the first signal may dictate an initial Q parameter for performing the inventory operation according to a Q-algorithm, and the second signal may dictate the initial Q parameter or a different Q parameter for restarting the inventory according to the Q-algorithm.

The antenna change from the first antenna to the second antenna may include selecting the second antenna to radiate the second signal from among a plurality of antennas associated with the RFID reader system based on one of: a predefined algorithm, an order of available antennas, and by random selection, in which the selection is different depending on whether any tags are sensed through the first antenna. Furthermore, selecting the second antenna may be delayed until an operation for a specific tag is completed.

According to yet another embodiment, the method may further include turning off the first signal for a second reason that is other than for an antenna change from the first antenna to the second antenna, determining whether the first tag operation is to be continued due to the second reason, and if the first tag operation is not to be continued causing a third signal to be radiated through the first antenna, for a third tag operation.

The second reason may be a change from a first frequency to a second frequency for a Frequency Hopping Spread Spectrum (FHSS) operation of the reader system. The second reason may be a completion of the first tag operation, where the method further includes restarting another tag operation when the third signal is radiated through the first antenna without repeating a portion of the first tag operation performed when the first signal is radiated.

According to a yet further embodiment, the first tag operation may be a tag inventory operation, and the method may further include continuing to inventory the tags when the third signal is radiated without repeating a portion of the inventory performed when the first signal is radiated, performing a TPC before beginning the inventory when the first signal is radiated, where the TPC is not repeated when the second signal is radiated.

The first signal may dictate an initial Q parameter for performing the inventory operation according to a Q-algorithm, and the second signal may use a Q parameter value determined by the reader when the first operation is interrupted. If the inventory is completed about an expiration of a dwell period on a first frequency, the frequency change due to the FHSS operation and an antenna change from the first antenna to the second antenna may be combined. Combining the frequency change and the antenna change may include performing the antenna change earlier than a predefined time or performing the frequency change before the expiration of the dwell period.

Figure 10:
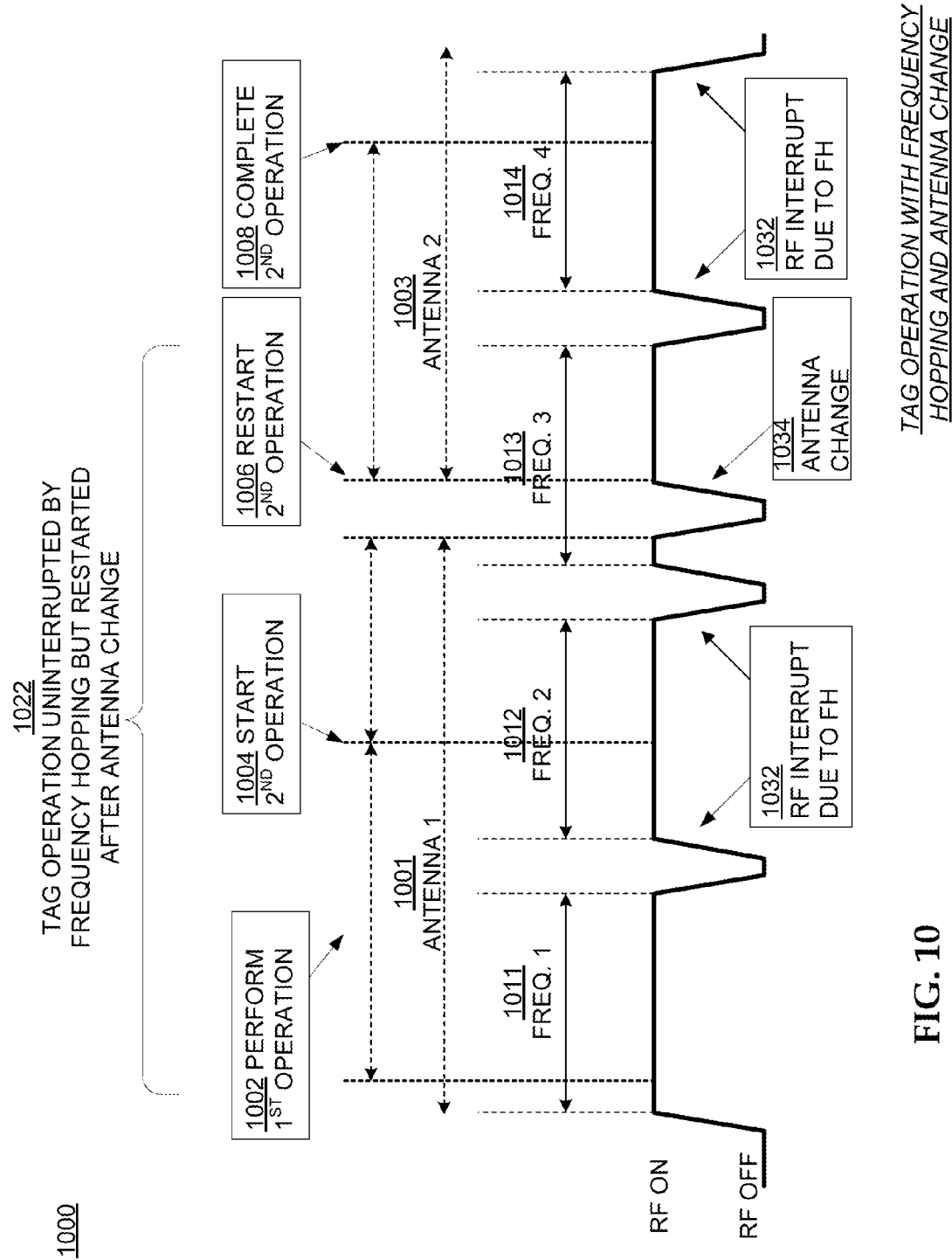
FIG. 10 is a diagram illustrating an operation of an RFID reader system restarting a tag operation when interrupted due to antenna switching and frequency hopping according to embodiments.

FIG. 10 is a diagram illustrating an operation of an RFID reader system restarting a tag operation when interrupted due to antenna switching and frequency hopping according to embodiments.

An antenna change may result in the reader facing a substantially different tag population. In consequence, the tag operation (e.g. an inventory operation using a Q algorithm) may have to be restarted with initialized parameters.

As illustrated by diagram 1000, the reader uses frequencies 1, 2, 3, and 4 (1011 through 1014) during the FHSS operation with RF interruptions (1032) between different frequencies and RF interruption 1034 for changing antennas from antenna 1 (1001) to antenna 2 (1003). A first tag operation begins (1002) during the transmission of the RF signal using frequency 1 (1011).

When the first RF interruption occurs, the first tag operation is continued upon the reader beginning to transmit on frequency 2 (1012), resulting in uninterrupted tag operation by frequency hopping. Similarly the second operation 1004 is started on the second frequency.

When the antenna change occurs interrupting the second operation, however, the reader restarts the second operation (1006) on frequency 3 (1013). Another frequency switch interruption does not cause a restart and the second operation is completed (1008) on frequency 4 (1014).

Because the tag population is likely to change between the two antennas, the reader does not risk performing a tag operation over distinct tag populations and wasting time to recover errors.

Figure 11:
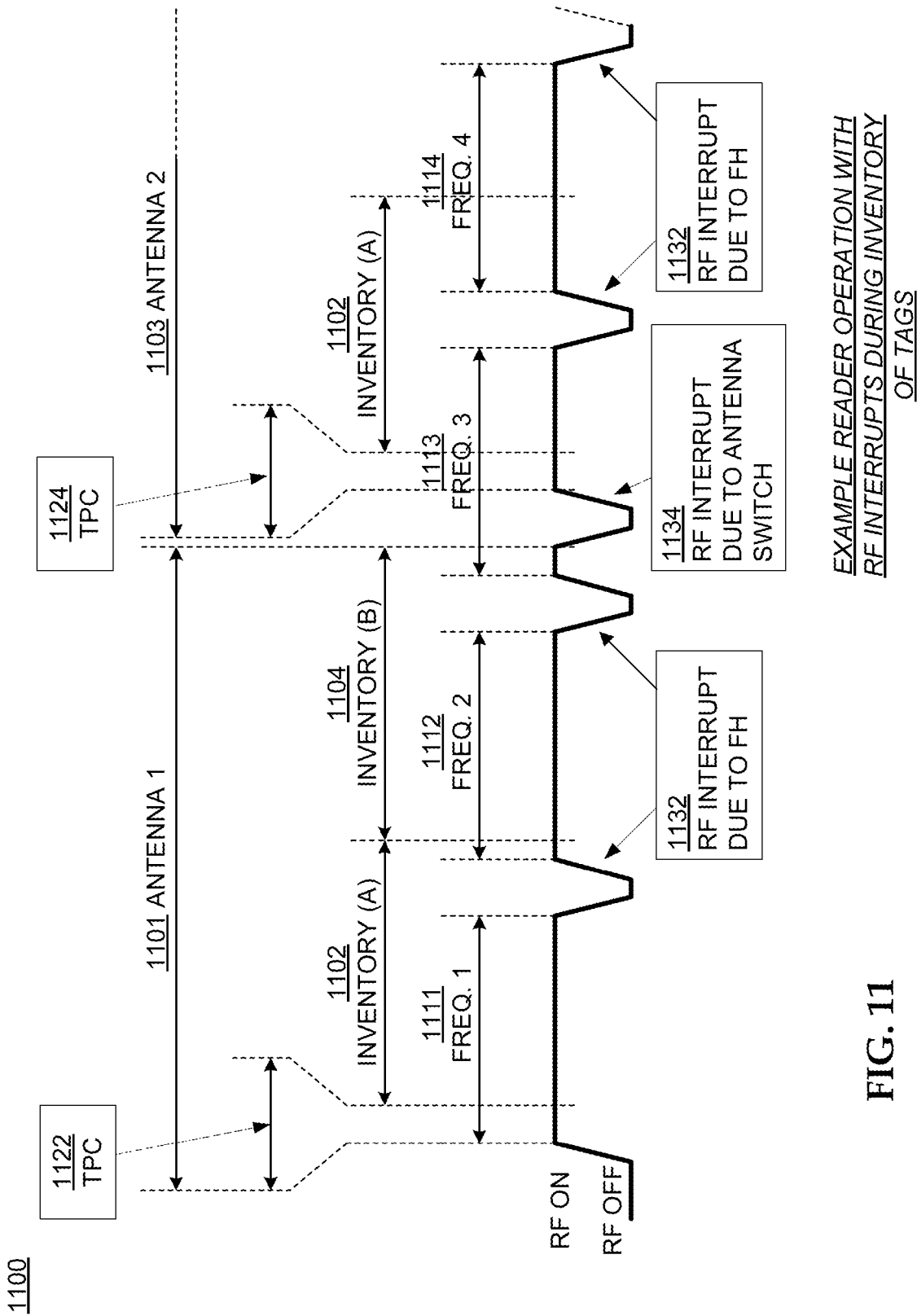
FIG. 11 is a diagram illustrating improvements in the tag inventory process of an RFID reader system as a result of initializing differently following an RF signal interruption.

FIG. 11 is a diagram illustrating improvements in the tag inventory process of an RFID reader system as a result of initializing differently following an RF signal interruption.

As shown in diagram 1100, the reader begins its operations by performing a TPC (1122) on a tag population while transmitting on frequency 1 (1111) through the first antenna (1101). The TPC 1122 is followed by inventory operation (A) 1102. When the frequency dwell time expires, the reader switches to frequency 2 (1112) after a brief RF interruption (1132) still through the first antenna. Because the reason for the RF interruption is frequency switch, the inventory operation 1102 is continued without a restart after the reader begins transmitting on frequency 2.

After completion of the inventory operation 1102, a second inventory operation (B) 1104 is started while the reader is still transmitting on frequency 2 through the first antenna without a renewed TPC. The second inventory operation (B) 1104 is also continued without a restart when the reader switches from frequency 2 (1112) to frequency 3 (1113) through the first antenna.

When the operation(s) are interrupted (1134) due to an antenna change from the first antenna (1101) to a second antenna (1103), however, a new TPC (1124) is performed because the tag population may have changed. After the TPC 1124 operation, a first inventory operation 1102 is restarted through the second antenna with initialized parameters (Q parameter value).

Another RF interruption 1132 due to frequency switch through the second antenna does not cause the new inventory operation to be restarted. Similar to the previous operations through the first antenna, the inventory operation (A) 1102 is continued when the reader switches to frequency 4 (1114) still transmitting through the second antenna.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and subcombinations of elements, features, steps, and/or functions, which are regarded as novel and non-obvious. Additional claims for other combinations and sub-combinations may be presented in this or a related document.

What is claimed is:

1. A method for an RFID reader system employing antenna switching, comprising: causing a first signal for a first tag operation to be radiated through a first antenna; turning off the first signal for a first reason, wherein the first tag operation includes a tag inventory operation; determining whether the first reason is an antenna change from the first antenna to a second antenna; if the first reason is the antenna change, causing a second signal to be radiated through the second antenna, for a second tag operation that does not continue the first tag operation, wherein the second tag operation includes restarting the tag inventory operation though the second antenna.

2. The method of claim 1, in which the first tag operation further includes a Tag Population Check (TPC) before starting the tag inventory operation.

3. The method of claim 2, in which the second tag operation further includes another TPC before restarting the tag inventory operation through the second antenna.

4. The method of claim 1, in which the second signal is radiated responsive to detecting that tags me present in the reader's field of view.

5. The method of claim 1, in which the first signal dictates an initial Q parameter for performing the tag inventory operation according to a Q-algorithm.

6. The method of claim 5, in which the second signal dictates the initial Q parameter for restarting the tag inventory operation according to the Q-algorithm.

7. The method of claim 5, in which the second signal dictates a different Q parameter for restarting the tag inventory operation according to the Q-algorithm.

8. The method of claim 1, in which the antenna change from the first antenna to the second antenna includes: selecting the second antenna to radiate the second signal from among a plurality of antennas associated with the RFID reader system based on one of: a predefined algorithm, an order of available antennas, and by random selection, in which the selection is different depending on whether may tags are sensed through the first antenna.

9. The method of claim 8, in which selecting the second antenna is delayed until an operation for a specific tag is completed.

10. The method of claim 1, further comprising: turning off the first signal for a second reason that is other than for an antenna change from the first antenna to the second antenna; determining whether the first tag operation is to be continued due to the second reason; if the first tag operation is not to be continued, causing a third signal to be radiated through the first antenna, for a third tag operation.

11. The method of claim 10, in which the second reason is a change from a first frequency to a second frequency for a Frequency Hopping Spread Spectrum (FHSS) operation of the reader system.

12. The method of claim 10, in which the second reason is a completion of the first tag operation, and the method further comprises: restarting another tag operation when the third signal is radiated through the first antenna without repeating a portion of the first tag operation performed when the first signal is radiated.

13. The method of claim 10, further comprising continuing to inventory the tags when the third signal is radiated without repeating a portion of the tag inventory operation performed when the first signal is radiated.

14. The method of claim 13, further comprising: performing a TPC before beginning the tag inventory operation when the first signal is radiated, in which the TPC is not repeated when the second signal is radiated.

15. The method of claim 13, in which the first signal dictates an initial Q parameter for performing the tag inventory operation according to a Q-algorithm; and the second signal uses a Q parameter value determined by the reader when the first operation is interrupted.

16. The method of claim 13, further comprising: if the tag inventory operation is completed about an expiration of a dwell period on a first frequency, combining a frequency change due to an FHSS operation and an antenna change from the first antenna to the second antenna.

17. The method of claim 16, in which combining the frequency change and the antenna change includes performing the antenna change earlier than a predefined time.

18. The method of claim 16, in which combining the frequency change and the antenna change includes performing the frequency change before the expiration of the dwell period.

19. The method of claim 16, further comprising: if the second reason is the frequency change and the antenna change occurring at the same time, restarting the tag inventory operation when the third signal is radiated.

20. An RFID reader system employing antenna switching, the system comprising:
at least a first antenna and a second antenna; a signal processing circuit coupled to the first and second antenna configured to: cause a first signal for a first tag operation to be radiated through a first antenna; turn off the first signal for a first reason, wherein the first tag operation includes a tag inventory operation; determine whether the first reason is an antenna change from the first antenna to a second antenna; if the first reason is the antenna change, cause a second signal to be radiated through the second antenna, for a second tag operation that does not continue the first tag operation, wherein the second tag operation includes restarting the tag inventory operation though the second antenna.

21. The RFID reader system of claim 20, in which the first tag operation further includes a Tag Population Check (TPC) before starting the tag inventory operation.

22. The RFID reader system of claim 20, in which the second tag operation further includes another TPC before restarting the tag inventory operation through the second antenna.

23. The RFID reader system of claim 20, in which the second signal is radiated responsive to detecting that tags are present in the reader's field of view.

24. The RFID reader system of claim 20, in which the first signal dictates an initial Q parameter for performing the tag inventory operation according to a Q-algorithm.

25. The RFID reader system of claim 24, in which the second signal dictates the initial Q parameter for restarting the tag inventory operation according to the Q-algorithm.

26. The RFID reader system of claim 24, in which the second signal dictates a different Q parameter for restarting the tag inventory operation according to the Q-algorithm.

27. The RFID reader system of claim 20, in which the antenna change from the first antenna to the second antenna includes: selecting the second antenna to radiate the second signal from among a plurality of antenna associated with the RFID reader system based on one of: a predefined algorithm, an order of available antennas, and by random selection, in which the selection is different depending on whether may tags are sensed through the first antenna.

28. The RFID reader system of claim 27, in which selecting the second antenna is delayed until an operation for a specific tag is completed.

29. The RFID reader system of claim 20, in which the signal processing circuit is further configured to: turn off the first signal for a second reason that is other than for an antenna change from the first antenna to the second antenna; determine whether the first tag operation is to be continued due to the second reason; if the first tag operation is not to be continued, cause a third signal to be radiated through the first antenna, for a third tag operation.

30. The RFID reader system of claim 29, in which the second reason is a change from a first frequency to a second frequency for a Frequency Hopping Spread Spectrum (FHSS) operation of the reader system.

31. The RFID reader system of claim 29, in which the second reason is a completion of the first tag operation, and the signal processing circuit is further configured to
restart another tag operation when the third signal is radiated through the first antenna without repeating a portion of the first tag operation performed when the first signal is radiated.

32. The RFID reader system of claim 29, in which the signal processing circuit is further configured to continue to inventory the tags when file third signal is radiated without repeating a portion of the tag inventory operation performed when the first signal is radiated.

33. The RFID reader system of claim 32, in which the signal processing circuit is further configured to: perform a TPC before beginning the tag inventory operation when the first signal is radiated, in which the TPC is not repeated when the second signal is radiated.

34. The RFID reader system of claim 32, in which the first signal dictates an initial Q parameter for performing the tag inventory operation according to a Q-algorithm; and the second signal uses a Q parameter value determined by the reader when the first operation is interrupted.

35. The RFID reader system of claim 32, in which the signal processing circuit is further configured to: if the tag inventory operation is completed about an expiration of a dwell period on a first frequency, combine a frequency change due to an FHSS operation and an antenna change from the first antenna to the second antenna.

36. The RFID reader system of claim 35, in which combining the frequency change and the antenna change includes performing the antenna change earlier than a predefined time.

37. The RFID reader system of claim 35, in which combining the frequency change and the antenna change includes performing the frequency change before the expiration of the dwell period.

38. The RFID reader system of claim 35, in which the signal processing circuit is further configured to if the second reason is the frequency change and the antenna change occurring at the same time, restart the tag inventory operation when the third signal is radiated.

39. A Digital Signal Processing (DSP) chip for an RFID reader system coupled to at least a first antenna and a second antenna, the DSP chip comprising: circuitry configured to: cause a first signal for a first tag operation to be radiated though a first antenna; turn off the first signal for a first reason, wherein the first tag operation includes a tag inventory operation; determine whether the first reason is an antenna change from the first antenna to a second antenna; if the first reason is the antenna change, cause a second signal to be radiated through the second antenna, for a second tag operation that does not continue the first tag operation, wherein the second tag operation includes restarting the tag inventory operation though the second antenna.

40. The DSP chip of claim 39, in which the first tag operation further includes a Tag Population Check (TPC) before starting the tag inventory operation.

41. The DSP chip of claim 40, in which the second tag operation further includes another TPC before restarting the tag inventory operation through the second antenna.

42. The DSP chip of claim 39, in which the second signal is radiated responsive to detecting that tags are present in the reader's field of view.

43. The DSP chip of claim 39, in which the first signal dictates an initial Q parameter for performing the tag inventory operation according to a Q-algorithm.

44. The DSP chip of claim 43, in which the second signal dictates the initial Q parameter for restarting the tag inventory operation according to the Q-algorithm.

45. The DSP chip of claim 43, in which the second signal dictates a different Q parameter for restarting the tag inventory operation according to the Q-algorithm.

46. The DSP chip of claim 39, in which the antenna change from the first antenna to the second antenna includes: selecting the second antenna to radiate the second signal from among a plurality of antennas associated with the DSP chip based on one of a predefined algorithm, an order of available antennas, and by random selection, in which the selection is different depending on whether may tags are sensed through the first antenna.

47. The DSP chip of claim 46, in which selecting the second antenna is delayed until an operation for a specific tag is completed.

48. The DSP chip of claim 39, in which the circuitry is further configured to: turn off the first signal for a second reason that is other than for an antenna change from the first antenna to the second antenna; determine whether the first tag operation is to be continued due to the second reason; if the first tag operation is not to be continued, cause a third signal to be radiated through the first antenna, for a third tag operation.

49. The DSP chip of claim 48, in which the second reason is a change from a first frequency to a second frequency for a Frequency Hopping Spread Spectrum (FHSS) operation of the reader system.

50. The DSP chip of claim 48, in which the second reason is a completion of the first tag operation, and the circuitry is further configured to restart another tag operation when the third signal is radiated through the first antenna without repeating a portion of the first tag operation performed when the first signal is radiated.

51. The DSP chip of claim 48, in which the circuitry is further configured to: continue to inventory the tags when the third signal is radiated without repeating a portion of the tag inventory operation performed when the first signal is radiated.

52. The DSP chip of claim 51, in which the circuitry is further configured to: perform a TPC before beginning the tag inventory operation when the first signal is radiated, in which the TPC is not repeated when the second signal is radiated.

53. The DSP chip of claim 51, in which the first signal dictates an initial Q parameter for performing the tag inventory operation according to a Q-algorithm; and the second signal uses a Q parameter value determined by the reader when the first operation is interrupted.

54. The DSP chip of claim 51, in which the circuitry is further configured to: if the tag inventory operation is completed about an expiration of a dwell period on a first frequency, combine a frequency change due to an FHSS operation and an antenna change from the first antenna to the second antenna.

55. The DSP chip of claim 54, in which combining the frequency change and the antenna change includes performing the antenna change earlier than a predefined time.

56. The DSP chip of claim 54, in which combining the frequency change and the antenna change includes performing the frequency change before the expiration of the dwell period.

57. The DSP chip of claim 54, in which the circuitry is further configured to: if the second reason is the frequency change and the antenna change occurring at the same time, restart the tag inventory operation when the third signal is radiated.

58. A non-transitory machine-readable storage medium with instructions encoded thereon for operating an RFID reader system coupled to at least a first antenna, the instructions such that, if executed by a machine that is reading them result in operations comprising:
  causing a first signal for a first tag operation to be radiated through a first antenna; turning off the first signal for a first reason, wherein the first tag operation includes a tag inventory operation; determining whether the first reason is an antenna change from the first antenna to a second antenna; if the first reason is the antenna change, causing a second signal to be radiated through the second antenna, for a second tag operation that does not continue the first tag operation, wherein the second tag operation includes restarting the tag inventory operation though the second antenna.

59. The non-transitory medium of claim 58, in which the first tag operation further includes a Tag Population Check (TPC) before starting the tag inventory operation.

60. The non-transitory medium of claim 59, which the second tag operation further includes another TPC before restarting the tag inventory operation through the second antenna.

61. The non-transitory medium of claim 58, in which the second signal is radiated responsive to detecting that tags are present in the reader's field of view.

62. The non-transitory medium of claim 58, in which the first signal dictates an initial Q parameter for performing the tag inventory operation according to a Q-algorithm.

63. The non-transitory medium of claim 62, in which the second signal dictates the initial Q parameter for restarting the tag inventory operation according to the Q-algorithm.

64. The non-transitory medium of claim 62, in which the second signal dictates a different Q parameter for restarting the tag inventory operation according to the Q-algorithm.

65. The non-transitory medium of claim 58, in which the antenna change from the first antenna to the second antenna includes: selecting the second antenna to radiate the second signal from among a plurality of antennas associated with the RFID reader system based on one of: a predefined algorithm, an order of available antennas, and by random selection, in which the selection is different depending on whether any tags are sensed through the first antenna.

66. The non-transitory medium of claim 65, in which selecting the second antenna is delayed until an operation for a specific tag is completed.

67. The non-transitory medium of claim 58, the operations further comprising: turning off the first signal for a second reason that is other than for an antenna change from the first antenna to the second antenna; determining whether the first tag operation is to be continued due to the second reason; if the first tag operation is not to be continued, causing a third signal to be radiated through the first antenna, for a third tag operation.

68. The non-transitory medium of claim 67, in which the second reason is a change from a first frequency to a second frequency for a Frequency Hopping Spread Spectrum (FHSS) operation of the reader system.

69. The non-transitory medium of claim 67, in which the second reason is a completion of the first tag operation, and the operations further comprise: restarting another tag operation when the third signal is radiated through the first antenna without repeating a portion of the first tag operation performed when the first signal is radiated.

70. The non-transitory medium of claim 67, in which the operations further comprise: continuing to inventory the tags when the third signal is radiated without repeating a portion of the tag inventory operation performed when the first signal is radiated.

71. The non-transitory medium of claim 70, the operations further comprising: performing a TPC before beginning the tag inventory operation when the first signal is radiated, in which the TPC is not repeated when the second signal is radiated.

72. The non-transitory medium of claim 70, in which the first signal dictates an initial Q parameter for performing the tag inventory operation according to a Q-algorithm; and the second signal uses a Q parameter value determined by the reader when the first operation is interrupted.

73. The non-transitory medium of claim 70, the operations further comprising: if the tag inventory operation is completed about an expiration of a dwell period on a first frequency, combining a frequency change due to an FHSS operation and an antenna change from the first antenna to the second antenna.

74. The non-transitory medium of claim 73, in which combining the frequency change and the antenna change includes performing the antenna change earlier than a predefined time.

75. The non-transitory medium of claim 73, in which combining the frequency change and the antenna change includes performing the frequency change before the expiration of the dwell period.

76. The non-transitory medium of claim 73, the operations further comprising: if the second reason is the frequency change and the antenna change occurring at the same time, restarting the tag inventory operation when the third signal is radiated.

* * * * *

UNITED STATES PATENT AND TRADEMARK OFFICE
CERTIFICATE OF CORRECTION

PATENT NO. : 7,920,046 B1  
APPLICATION NO. : 11/774338  
DATED : April 5, 2011  
INVENTOR(S) : Aiouaz et al.

It is certified that error appears in the above-identified patent and that said Letters Patent is hereby corrected as shown below:

1) Please delete "though" in Claim 1 (column 15, line 40) and insert -- through --, therefor.
2) Please delete "me" in Claim 4 (column 15, line 49) and insert -- are --, therefor.
3) Please delete "may" in Claim 8 (column 15, line 66) and insert -- any --, therefor.
4) Please delete "though" in Claim 20 (column 16, line 64) and insert -- through --, therefor.
5) Please delete "antenna" in Claim 27 (column 17, line 20) and insert -- antennas --, therefor.
6) Please delete "may" in Claim 27 (column 17, line 23) and insert -- any --, therefor.
7) In Claim 31 (column 17, line 42) after "to" please insert -- : --.
8) In Claim 32 (column 17, line 48) after "to" please insert -- : --.
9) Please delete "file" (column 17, line 49) and insert -- the --, therefor.
10) In Claim 38 (column 18, line 9) after "to" please insert -- : --.
11) Please delete "though" in Claim 39 (column 18, line 18) and insert -- through --, therefor.
12) Please delete "though" in Claim 39 (column 18, line 26) and insert -- through --, therefor.
13) In Claim 46 (column 18, line 49) after "of" please insert -- : --.
14) Please delete "may" in Claim 46 (column 18, line 51) and insert -- any --, therefor.
15) In Claim 50 (column 19, line 3) after "to" please insert -- : --.
16) Please delete "though" in Claim 58 (column 19, line 51) and insert -- through --, therefor.
17) In Claim 60 (column 19, line 55) before "which" please insert -- in --.

Signed and Sealed this  
Twenty-eighth Day of June, 2011

David J. Kappos  
*Director of the United States Patent and Trademark Office*